No. 634,535. Patented Oct. 10, 1899.
L. P. MONIER & G. GLOECKLER.
APPARATUS FOR PRINTING, COUNTING, AND ISSUING TICKETS.
(Application filed Aug. 26, 1895.)
(No Model.) 9 Sheets—Sheet 1.
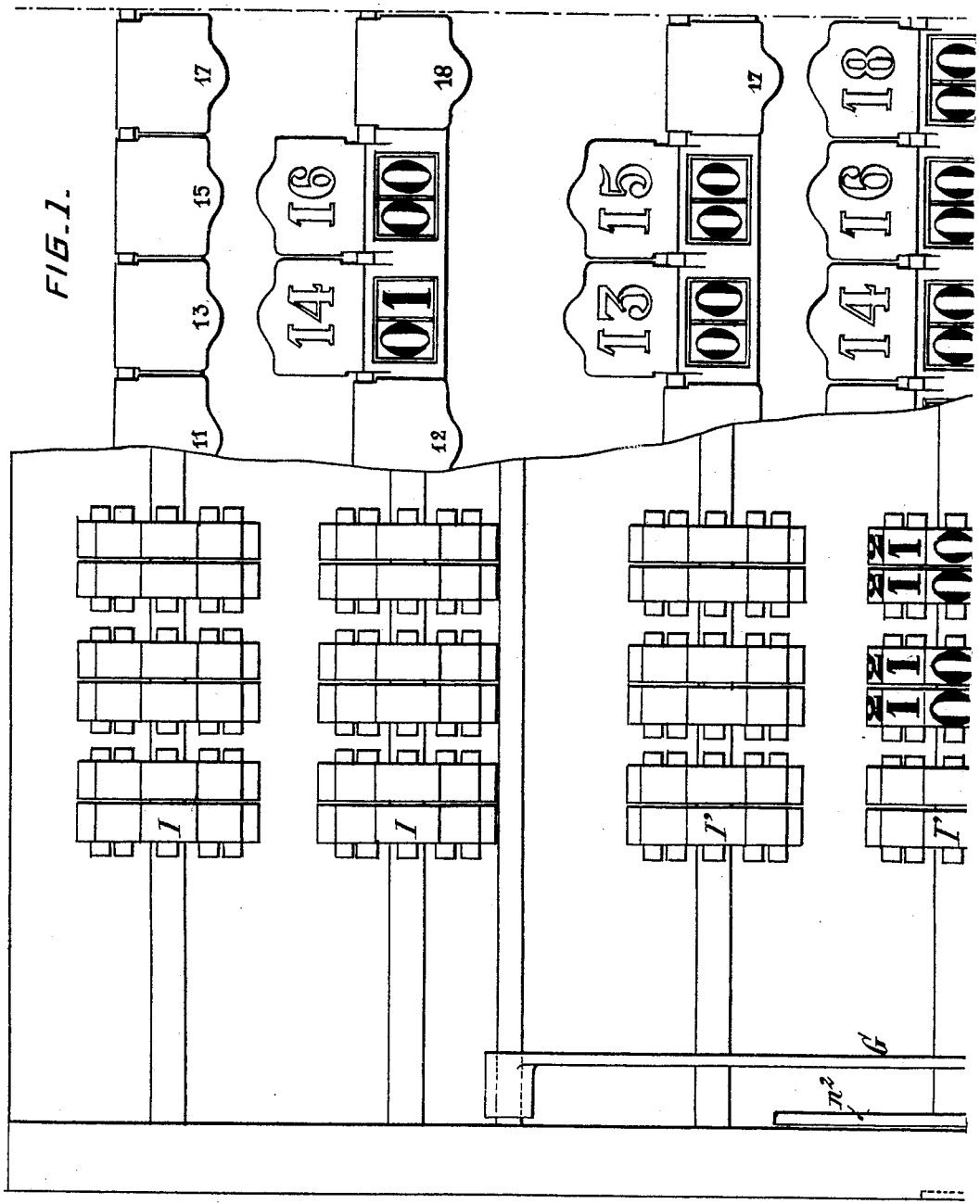

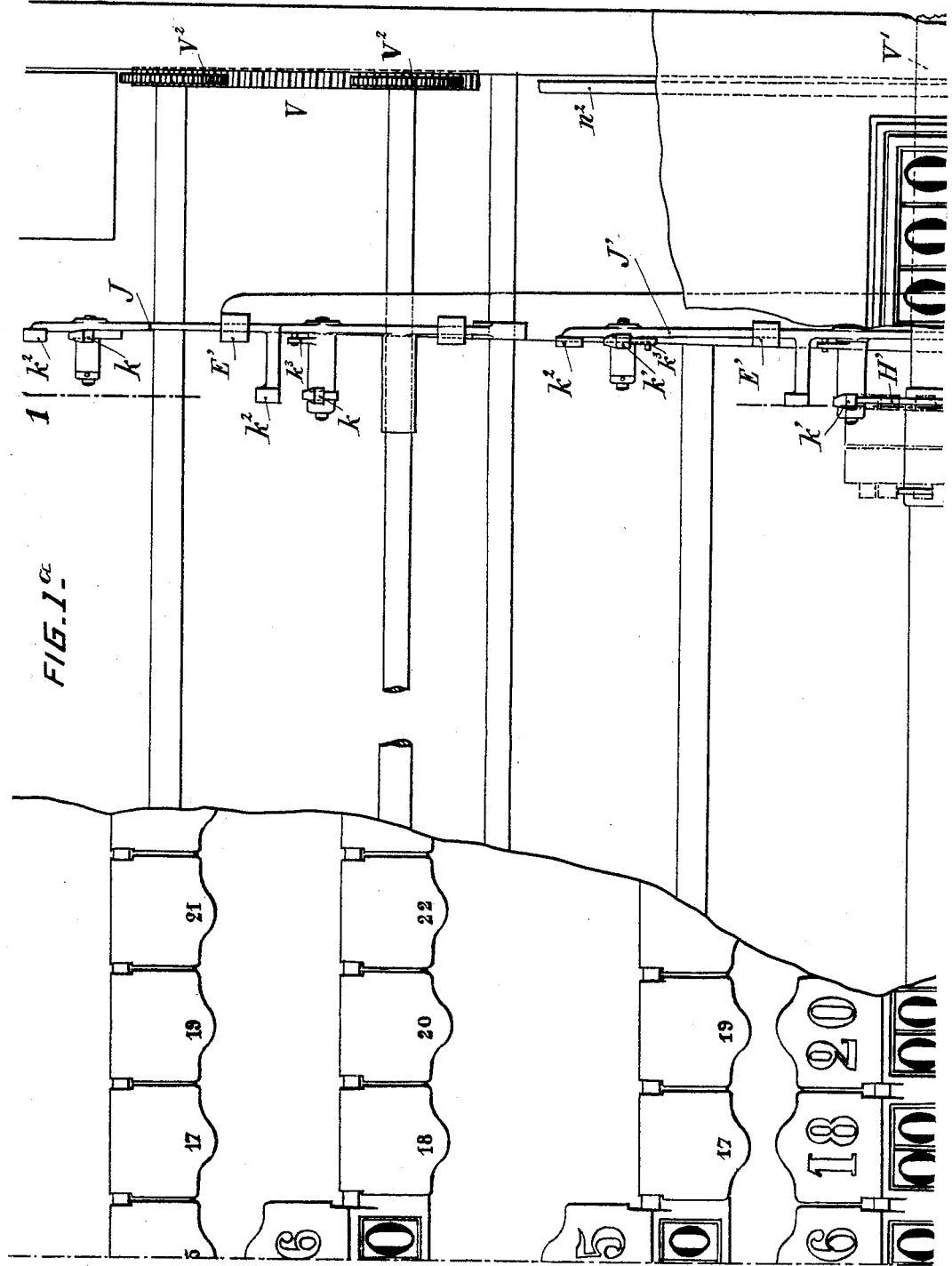

No. 634,535. Patented Oct. 10, 1899.
L. P. MONIER & G. GLOECKLER.
APPARATUS FOR PRINTING, COUNTING, AND ISSUING TICKETS.
(Application filed Aug. 26, 1895.)
(No Model.) 9 Sheets—Sheet 3.
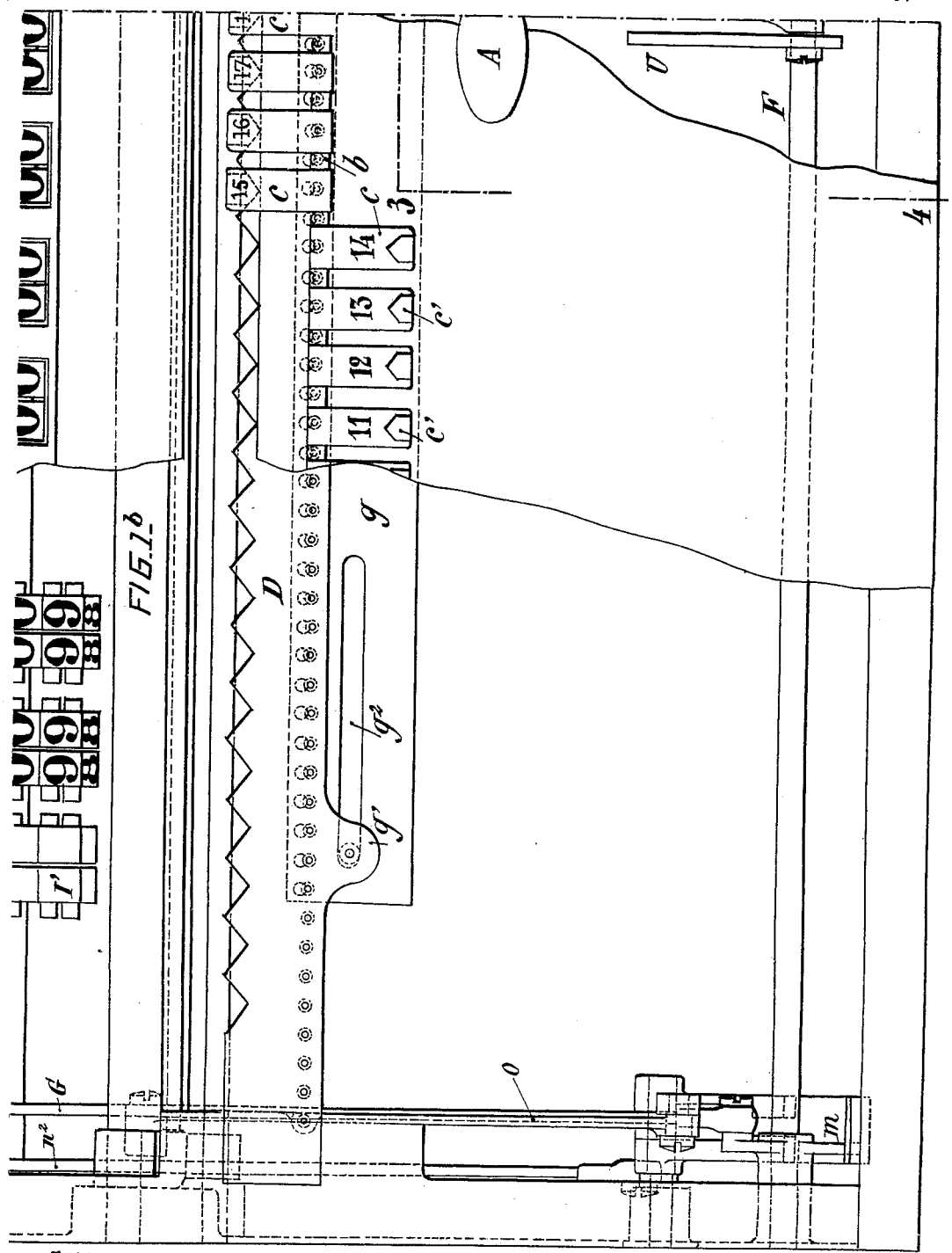

No. 634,535. Patented Oct. 10, 1899.
L. P. MONIER & G. GLOECKLER.
APPARATUS FOR PRINTING, COUNTING, AND ISSUING TICKETS.
(Application filed Aug. 26, 1895.)
(No Model.) 9 Sheets—Sheet 4.
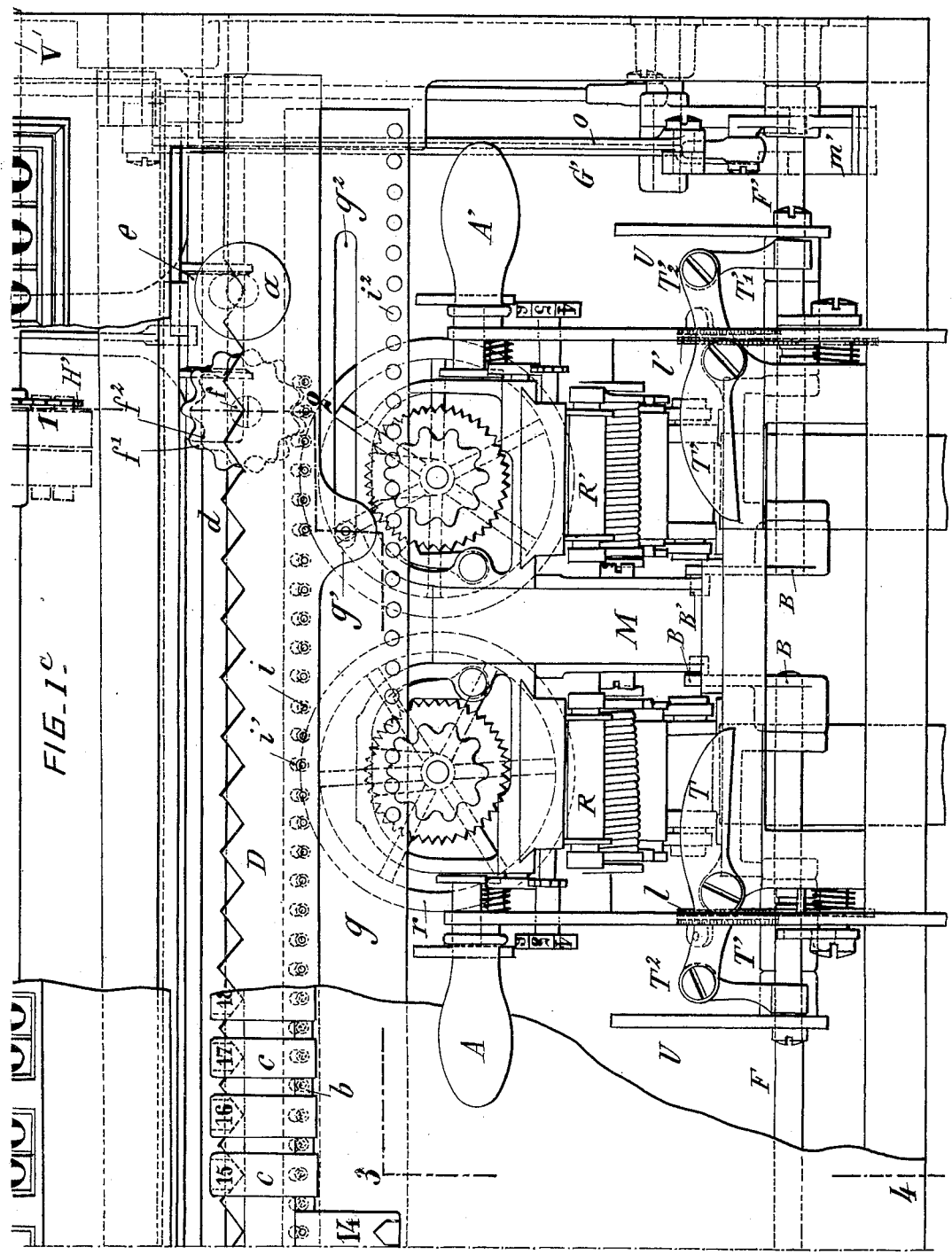

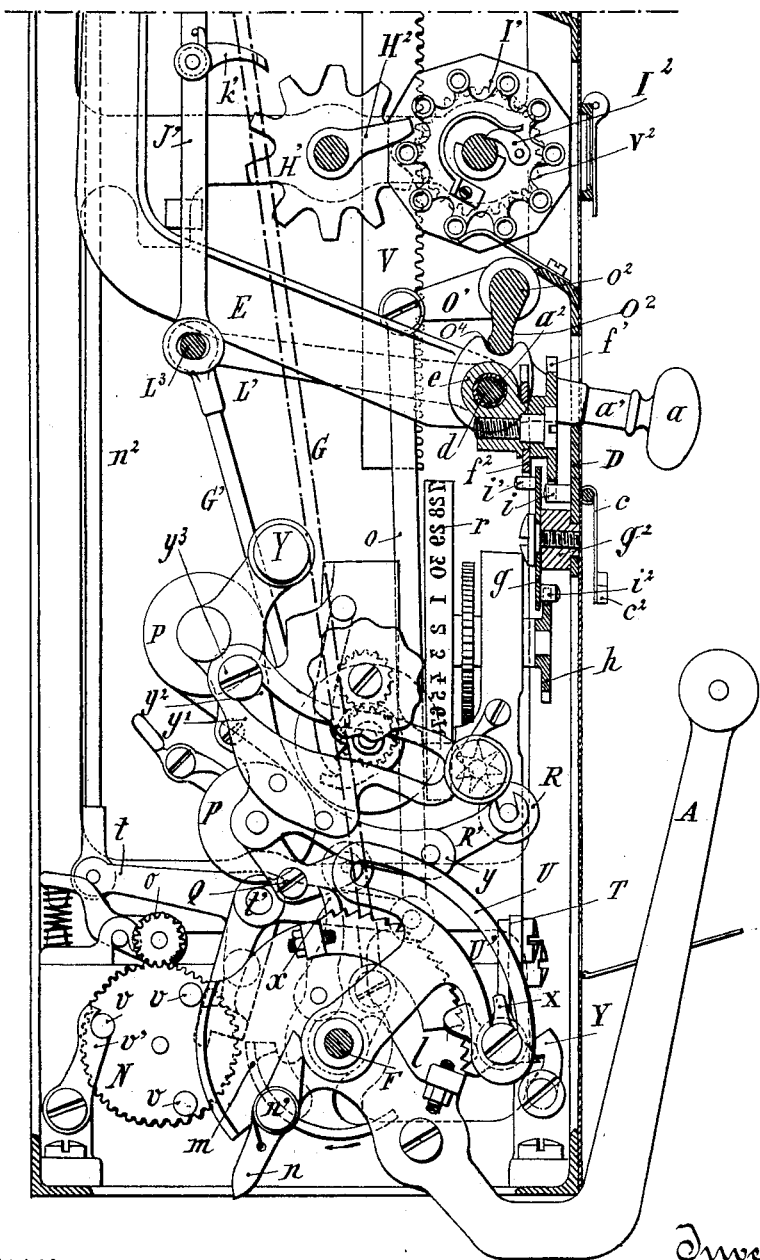

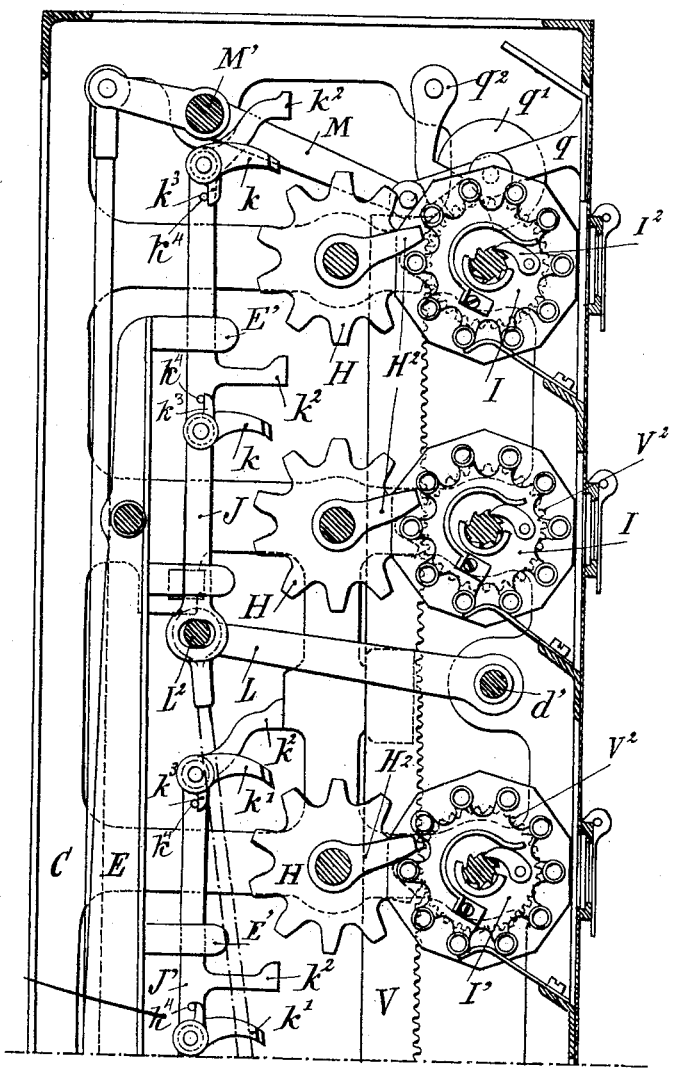

No. 634,535. Patented Oct. 10, 1899.
L. P. MONIER & G. GLOECKLER.
APPARATUS FOR PRINTING, COUNTING, AND ISSUING TICKETS.
(Application filed Aug. 26, 1895.)
(No Model.) 9 Sheets—Sheet 7.
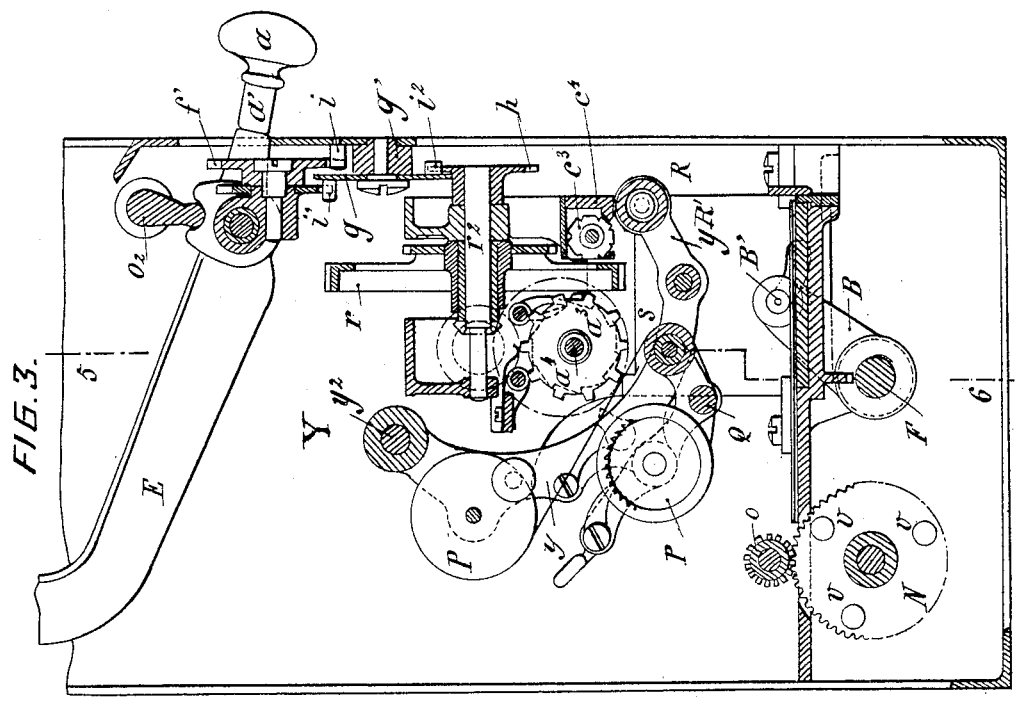
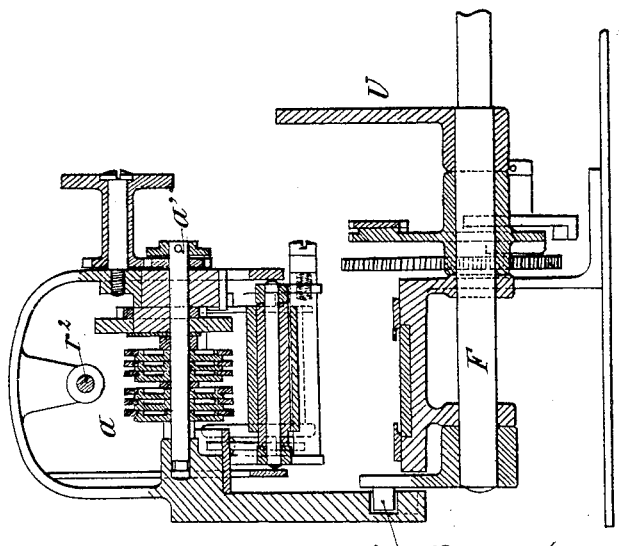

No. 634,535. Patented Oct. 10, 1899.
L. P. MONIER & G. GLOECKLER.
APPARATUS FOR PRINTING, COUNTING, AND ISSUING TICKETS.
(Application filed Aug. 26, 1895.)
(No Model.) 9 Sheets—Sheet 8.
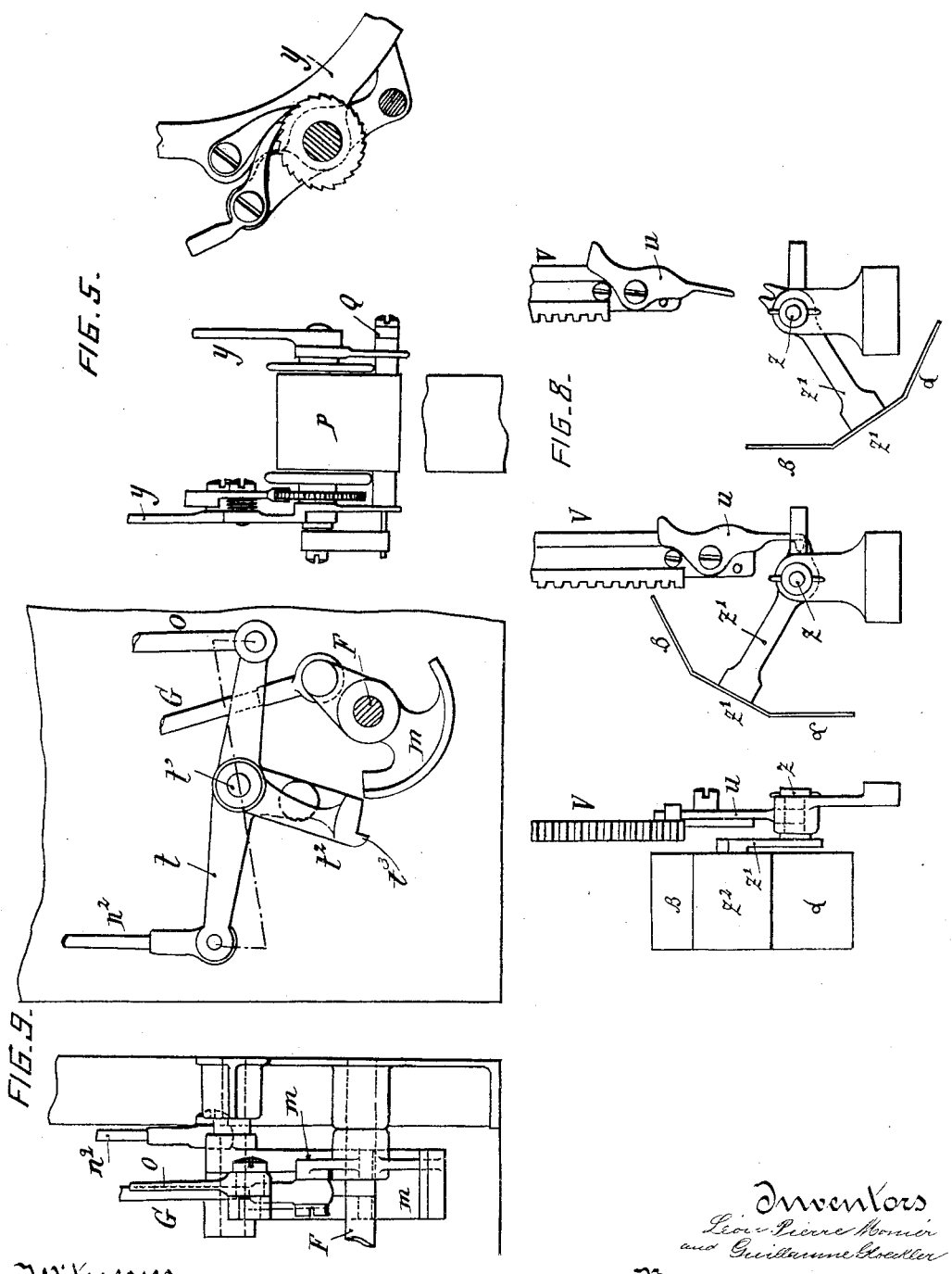

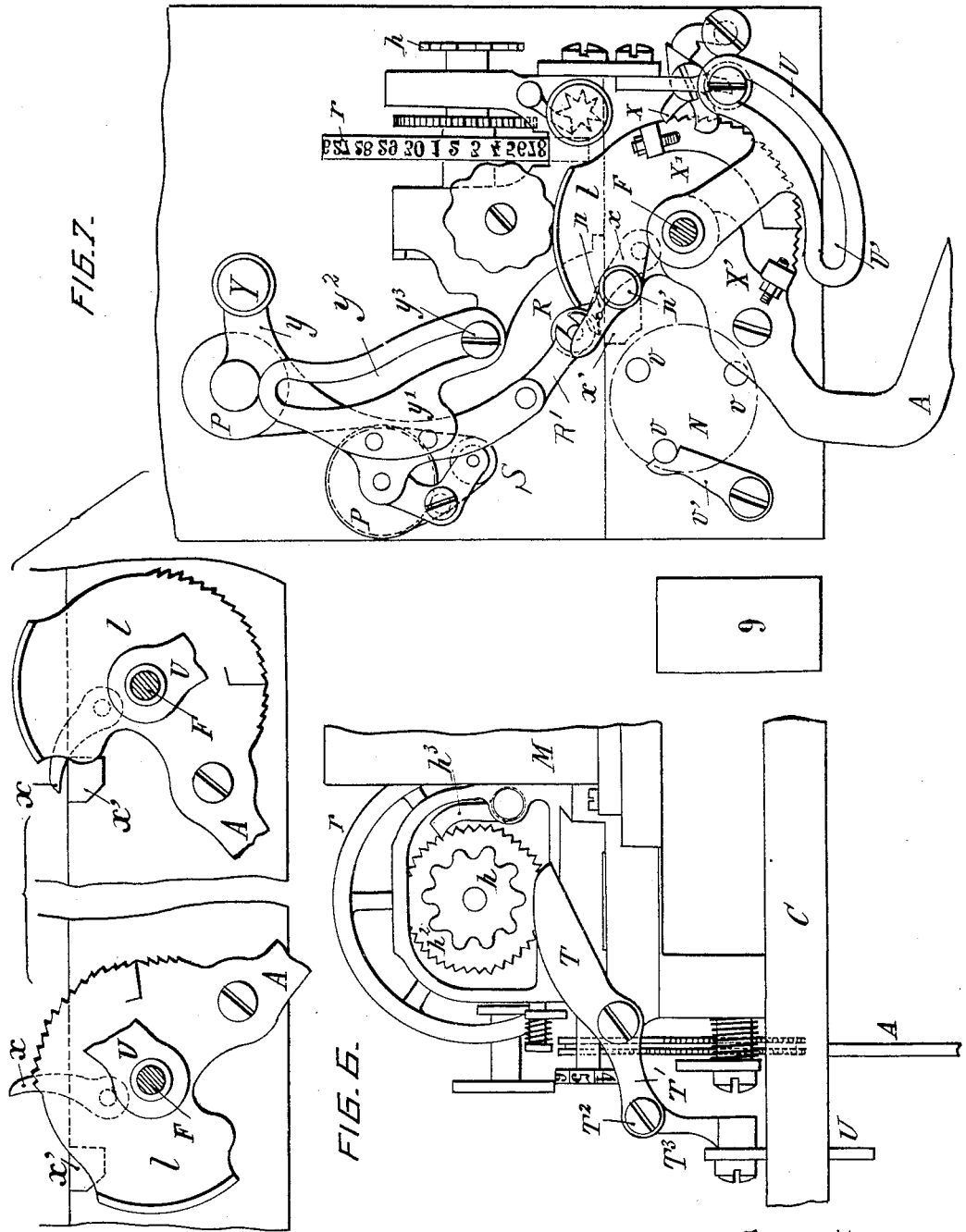

UNITED STATES PATENT OFFICE.

LÉON PIERRE MONIER AND GUILLAUME GLOECKLER, OF PARIS, FRANCE, ASSIGNORS TO LA SOCIÉTÉ ANONYME FRANCAISE DE L'APPAREIL CONTRÔLEUR, OF SAME PLACE.

APPARATUS FOR PRINTING, COUNTING, AND ISSUING TICKETS.

SPECIFICATION forming part of Letters Patent No. 634,535, dated October 10, 1899.

Application filed August 26, 1895. Serial No. 560,480. (No model.)

*To all whom it may concern:*

Be it known that we, LÉON PIERRE MONIER and GUILLAUME GLOECKLER, of the city of Paris, France, have invented Improvements in Apparatus for Printing, Counting, and Issuing Tickets and Printing Check-Strips, of which the following is a full, clear, and exact description.

This invention relates to apparatus for printing and delivering tickets and totalizing the amounts printed thereon.

The apparatus forming the subject-matter of this invention may be used for a variety of purposes wherever it is desired to employ an apparatus for printing, delivering, and totalizing tickets—such, for instance, as railway and theater tickets, &c.

The apparatus, which combines simplicity of construction with speed and accuracy in operation, is illustrated in the accompanying drawings, in which—

Figures 1, 1$^a$, 1$^b$, and 1$^c$ are face views of the apparatus, with a portion of the metal casing broken away. Figs. 2 and 2$^a$ are transverse vertical sections on lines 1 2 and 3 4 of Fig. 1$^c$. Fig. 3 is a vertical section showing the mechanism for bringing the sliding carriage into position to act on the totalizing mechanism to be actuated and also that for printing the check-strip. Fig. 4 is a vertical section on line 5 6, Fig. 3, taken through the axis of the type-wheels for printing the check-strip. Fig. 5 is a detail in face and side view of the check-strip feed mechanism. Fig. 6 is a face view of the shears and their operating mechanism. Fig. 7 is a side view of the ticket and check-strip printing mechanism. Fig. 8 represents details in face and side view of the device for indicating the return of the totalizers to zero. Fig. 9 is a detail face and edge view of the stop mechanism hereinafter referred to.

The apparatus is composed of the following principal parts, viz: first, the totalizing mechanisms and that for returning them to zero; second, the sliding carriage for determining the indications to be printed on the ticket; third, the ticket and check-strip printing mechanisms.

The apparatus is inclosed in a casing having an apertured tablet and containing four rows of totalizers. Those of the first two rows indicate, for instance, the numbers of employees who sell one particular character of materials and those of the other two rows the numbers of employees who sell a different character of goods or materials. At the end of each lower row is placed a general totalizer. Each totalizer comprises two decagonal drums I I', numbered from "0" to "9," one of which marks the "units" and the other the "tens" places of figures, each drum being fast on a pin-wheel having ten teeth. The pin-wheel corresponding to the units-wheel gears with an intermediate wheel H H', also having ten teeth, upon whose shaft is keyed a tappet H$^2$, which engages with the pin-wheel corresponding to the tens-wheel, so that the latter will rotate one tooth for every complete revolution of the units-wheel.

The totalizers are operated by pawls $k$ $k'$, mounted, respectively, upon vertical rods J J', which receive up-and-down movement through connecting-rods G G', jointed to rods L$^2$ L$^3$, which connect with the levers L L', mounted on shafts $d$ $d'$, supported at each end in the framing of the apparatus. The rods G G' are respectively attached to the quadrant of the corresponding lever-handle A.

In Fig. 2$^a$ each pawl $k$ $k'$ is shown as provided with a check-pawl $k^2$ and the sleeve of each pawl as provided with a lug $k^3$, which abuts against a stud $k^4$, mounted on rods J J', either above or below the axis of the pawl, according to the direction of its movement. The rods J J' move in guides E', carried by a supporting-frame E, operated as hereinafter described.

In order to return the totalizers to zero, the shafts upon which they are mounted are provided with longitudinal ratchet-toothed grooves, in which engage spring-pressed pawls I$^2$, carried by the pin-wheel of each totalizer-drum, as clearly shown in Fig. 2, all the shafts being turned together by a rack V, gearing with wheels V$^2$, keyed on said shafts and gearing with said rack.

Fig. 8 shows the arrangement we employ for insuring and indicating the return to zero of the totalizers. For this purpose the lower end of rack V carries a latch $u$, which is fitted to turn stiffly on its pivot and is provided with a nib at its extremity for engaging in a notch formed in the heel end of an arm Z′, oscillating on a center Z in a support fixed to the casing, the squared end V′ forming a prolongation of one or other of the spindles of the totalizer-drums, which projects outside the casing and upon which is placed the key for returning the parts to zero. On this return to zero being done the nib of the oscillating latch $u$ engages in the notch of and oscillates arm Z′, so as to cause a portion of the plate $Z^2$ to be exposed at an opening the color of which shows that the return to zero has been properly done. In Fig. 8 this portion of the plate $Z^2$ is indicated at $\alpha$, which is of white enamel, for example, the remainder being black.

The slider, which determines the indications to be printed on each of the tickets, comprises a knob $a$, which is capable of being shifted from end to end of the apparatus and of engaging in the notches of a plate D, fixed at its opposite ends to the casing, the number of the notches formed in the upper edge of the plate being equal to that of the numbers of the employees marked on the tablet. To each of these notches corresponds a key $c$, mounted on a bar $b$, fixed below said notches, which keys bear the numbers of the employees upon each of their faces and are capable of being turned down, while at their free end the keys are provided with a projection $c'$, which engages in a corresponding notch when the keys are raised. Behind the plate D is placed a shaft $d$, upon which slides a sleeve $a^2$, operated by the knob $a$, which is connected to said sleeve by a shank $a'$. The knob $a$ projects on the exterior of the tablet and serves to bring the sleeve into line with the numbers of the employees indicated. This sleeve works with the vertical support E, which carries the pawls of the totalizers, and it is controlled by the knob $a$, which serves to bring it into the plane of the totalizers to be actuated at each operation. The support is shifted longitudinally by raising knob $a$, so as to disengage it from the teeth of plate D, in which its shank $a'$, which is suitably shaped for the purpose, is received. The boss $e$ of support E carries the spindle $f$ of a double pinion $f'$ $f^2$, which is loosely mounted thereon. The pinion $f'$ gears with pins $i$ on the rear face of plate D and constitutes a fixed rack, while the pinion $f^2$ gears with the pins $i'$ of a sliding rack-bar $g$, mounted at back of plate D in the plane of pinion $f^2$ on guides $g'$, fixed on the plate D and engaging in slots $g^2$. The ratio between the number of teeth of the two pinions $f'$ $f^2$ is so regulated that the advance of the knob $a$ one notch causes the wheels $r$ $r'$, bearing the numbers of the employees, to advance one number. The sleeve $a^2$ of knob $a$ is provided with a groove $o^4$, (see Fig. 2,) in which engages a cross-bar $o^3$, extending parallel to shaft $d$. This cross-bar $o^3$ is suitably connected to a connecting-rod $o$, as, for instance, by means of an arm $o'$. The connecting-rod $o$ is mounted on the end of a T-shaped lever $t$, pivoted at $t'$, (see Fig. 9,) whose vertical arm $t^2$ is provided with a lug $t^3$ for engagement with and serving as an abutment for a quadrant $m$, mounted on an end of each of the shafts F F′ of lever-handles A A′ for the purpose of arresting the movement of the mechanism until each operation determined by the position of knob $a$ has been completed. To the left-hand end of the lever $t$ is jointed the end of a connecting-rod $n^2$, whose upper end is jointed to a lever M, pivoted at M′, Fig. 2ª, and jointed at its opposite end to an arm $q$, carrying plates bearing the words "Out of action" and "In action," which latter indication may, however, be omitted, as if the "stop" signal does not appear the apparatus may be presumed to be in action. The plate is held in either of its two positions by a pawl $q^2$, which engages in one or other of two notches made in a disk $q'$ on arm $q$. The tickets and check-strip are printed by means of duplicate sets of printing mechanisms, which are capable of vertical adjustment in the frame in which they are mounted. These duplicate printing mechanisms, which are shown in face views in the drawings and in side view in Figs. 2 and 3, are made both alike and are symmetrically disposed, the one on the right hand being operated by the handle A′ for indicating the employees' numbers selling one class of goods and that on the left by the handle A for indicating the numbers of the employees selling the other character of goods. The hand-levers A A′ are mounted at either side of the printing mechanisms on shafts F F′, respectively. The movements of the printing mechanisms are produced by the hand-levers A A′ and are transmitted thereto by an arm B, fixed on the end of each shaft F F′, said arm being provided with a pin B′ at its extremity, which engages in a groove in the frame, as represented in Figs. 3 and 4. Type-wheels $r$ $r'$ are employed for printing the numbers of the employees, and the spindles $r^2$ of these type-wheels carry toothed wheels $h$, which are acted on by the pins $i^2$ of the sliding rack $g$, previously described. The serial numbers and check-letters are printed on the tickets by type-wheels $a^3$, mounted on a spindle $a^4$, Figs. 3 and 4, and the permanent matter by the type-wheel $c^3$ and part $c^4$. The feeding of the cardboard strip for the tickets is effected by means of a roller N, over which it is caused to travel with the aid of spring-pressed roller $o$. The feed-roller N has upon one face three studs $v$, so disposed that each when impelled, as hereinafter described, will rotate the roller to an extent corresponding to the length of a ticket, it being held by the retaining-pawl $v'$ during the passing of the finger $n$, pivoted at $n'$ upon the quadrant $l$ of hand-lever A, and when said quadrant moves in the direction of the arrow in Fig. 2 the finger $n$ recedes to the position which it occupies when the hand-lever A is in the downward position represented in Fig. 7. When the hand-lever is again raised to its normal position, the finger $n$ will abut against the stud $v$ and carry around with it the roller N, so as to feed the strip forward for a distance equal to the length of a ticket. Each printing mechanism comprises a yoke $y$, pivoted at its upper extremity upon a fixed point Y, upon which it is free to oscillate, as shown in Figs. 2, 3, and 7. To this yoke is fixed a sector-shaped plate $y'$, provided with a cam-slot $y^2$, in which engages a pivot-pin $y^3$, fixed on the cheek-plate of the printing device. In the yoke $y$ is journaled a roller P, upon which is placed the check-strip, which unwinds therefrom and passes around the rubber roller S, and to its extremity is also jointed the arm R', which carries the inking-roller R. The check-strip which is to receive the impression on roller S is wound upon a roller $p$, which is also pivoted in yoke $y$. The movements of the yoke, together with the parts mounted thereon, as above described, are produced by the movement of pin $y^3$ in its slot, together with the other parts of the printing mechanism, as hereinafter described. The ticket after being printed is severed from the strip by means of the shears T T', Fig. 6, the shank T' of which is jointed at $T^2$ to a crank $T^3$, whose pin works in a slot U' in quadrant U of hand-lever A.

The hand-levers A A' each comprise—

First. A double quadrant $l$, each toothed on a portion of its circumference, the two toothed surfaces which serve the one for the downward and the other for the upward movement of the hand-lever being reversed in direction. X is a double pawl for engaging with the double-toothed surfaces, and Y is a check-pawl engaging with a tailpiece on said pawl X. X' X' are studs in quadrant $l$ for alternately reversing the fingers of pawl X.

Second. A spring-pressed finger $n$, before referred to, mounted on the opposite side of the quadrant $t$ to that of the teeth.

Third. A jointed finger $x$, acting in the two positions represented in Fig. 6. When raised to the position shown in Fig. 2, it serves to exert a thrust on roller Q, and when lowered and resting on the fixed abutment $x'$ it serves to bear on roller Q, mounted on the arm which carries the rubber roller S for printing the check-strip.

The action of the apparatus is as follows: Suppose, for example, the employee designated by the number "14" of the upper rows makes a sale. The knob $a$ is raised and placed in the notch indicated by the turned-down key $c$, bearing the number "14," the pawl-carrier E, which also partakes in the movement, being brought opposite the totalizers bearing the number "14." The hand-lever A is then pulled down and in this position locks the knob $a$ by engaging the lever $t$ with quadrant $m$. (See Fig. 9.) The printing mechanism moves downward, together with yoke $y$, through the crank-arm B of shaft F, and the printing of the ticket is effected, the shear-blade being at same time raised, as shown in Fig. 6. The lever A is then raised and with it the printing mechanism, during which movement the printed cardboard strip $i$ is advanced and the ticket severed by the shears, and during the latter period of this movement the finger $x$ acts on roller Q and prints the check-strip. The hand-lever and parts are then returned to their normal position in readiness for performing a fresh operation, the same movements being then repeated in the same order as before.

We claim—

1. In an apparatus for printing, delivering, totalizing and checking tickets, the combination of a pair of levers, a pointer actuated by said levers which actuate indicating mechanism at any one of a plurality of places, in combination with totalizers composed of two or more decagonal drums and with two sets of type-wheels, the one printing one designation and the other a different designation, said printing mechanism being carried by a vertically and laterally movable frame, and means connected with said frame for actuating the printing mechanism by the movement of the frame, as shown and described.

2. In an apparatus of the character described, the combination of a plurality of shafts, indicating-wheels loosely carried upon said shafts, ratchets upon the shafts, a pawl for each of said indicating-wheels, a single device for transmitting movement to a plurality of said indicating-wheels, each of said pawls being adapted to engage a coöperating ratchet upon one of the shafts, pinions carried by the shafts and a rack engaging all of said pinions to reset said indicating-wheels at a single operation of the rack, substantially as described.

3. The combination of a plurality of indicating devices, printing mechanism coöperating with said indicating devices to print the characters represented at each of the indicating devices, and to print the designation of the indicating devices operated, and a totalizing device coöperating with said indicating devices to automatically indicate the total amount indicated by said indicating device.

4. The combination of a plurality of indicating devices, printing mechanism coöperating with said indicating devices to print the characters represented at each of the indicating devices, and to print the designation of the indicating devices operated, a totalizing device coöperating with said indicating devices to automatically indicate the total amount indicated by said indicating device, and means for automatically cutting and distributing the tickets as they are printed.

5. The foregoing specification of our improvements in totalizing apparatus for printing, counting, and issuing tickets and printing check-strips for use in betting on the pari-mutuel system signed by us this 1st day of August, 1895.

LÉON PIERRE MONIER.
GUILLAUME GLOECKLER.

Witnesses:
CLYDE SHROPSHIRE,
ALBERT MOREAU.